Figure 1:
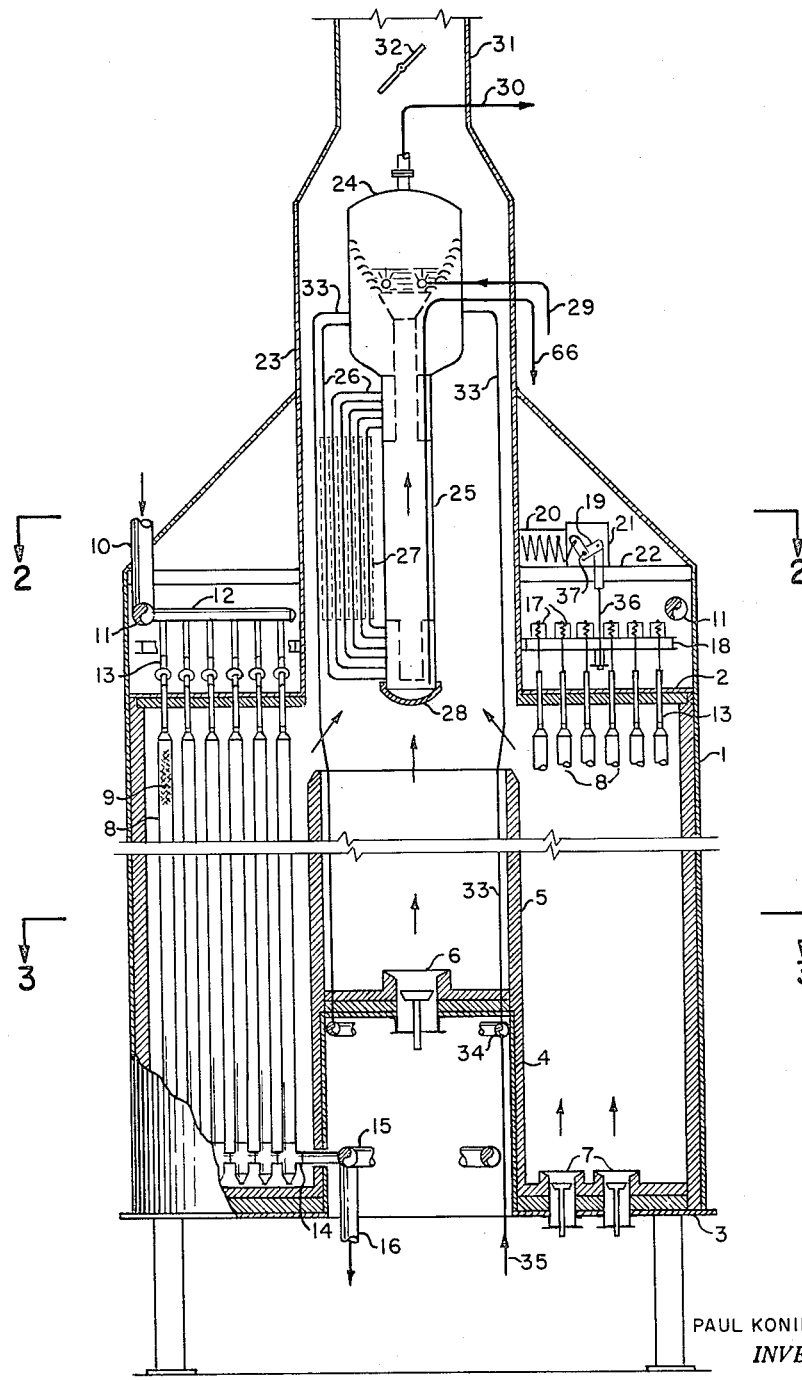

March 9, 1965 P. KONIEWIEZ 3,172,739
HYDROCARBON REFORM FURNACE
Filed Feb. 6, 1962 5 Sheets-Sheet 1

PAUL KONIEWIEZ
INVENTOR.

BY J. W. McCloskey
AGENT

PAUL KONIEWIEZ
*INVENTOR.*

BY J. W. McCloskey

*AGENT*

March 9, 1965   P. KONIEWIEZ   3,172,739
HYDROCARBON REFORM FURNACE
Filed Feb. 6, 1962   5 Sheets-Sheet 3

PAUL KONIEWIEZ
*INVENTOR.*

BY J.W. McCloskey
*AGENT*

United States Patent Office 3,172,739
Patented Mar. 9, 1965

3,172,739
HYDROCARBON REFORM FURNACE
Paul Koniewiez, Flushing, N.Y., assignor to Chemical Construction Corporation, New York, N.Y., a corporation of Delaware
Filed Feb. 6, 1962, Ser. No. 171,483
15 Claims. (Cl. 23—288)

The present invention relates to an improved hydrocarbon reform furnace for the catalytic reaction of fluid hydrocarbons with steam to produce synthesis gas. The improved apparatus of the present invention provides a new combination of apparatus elements, by means of which internal production and recovery of process heat as steam is accomplished in an improved manner. Thus, the furnace of the present invention is a natural draft unit in which the forced draft fans or blowers of the prior art have been eliminated, while maintaining sufficient draft head to circulate flue gas through an integral waste heat boiler. In addition, an improved suspension system for catalytic reformer tubes has been devised, as well as a new apparatus combination for connecting the lower ends of reformer tubes to form a continuous passage for process gas.

The present invention will be described in relation to the process of hydrocarbon conversion known as primary reforming, which is widely employed to produce synthesis gas and hydrogen. In this well-known process, a hydrocarbon fluid such as methane is catalytically reacted with steam at elevated temperatures, to produce a reformed gas mixture containing principally hydrogen, carbon monoxide and carbon dioxide. The reaction is preferably carried out at elevated pressures, although operation at substantially atmospheric pressure is also widely practiced. The overall reaction is endothermic, and consequently the usual procedure involves carrying out the reaction by passing the input mixture of hydrocarbon and steam through an externally heated tube or group of tubes. The tubes are packed with solid catalyst granules. The resulting product reformed gas mixture is withdrawn from the tubes of the reformer unit, and then passed to further processing. The requisite heating is usually provided by burning a hydrocarbon fuel with air, external to the catalyst-filled reformer tubes. Other heating means such as electrical resistance-type units may also be employed for this purpose. Since the reform reaction must be carried out at a highly elevated temperature, the resulting flue gas generated when a hydrocarbon fuel is burned to provide process heating, will be removed from the reformer furnace at a relatively high temperature. Sensible heat in this flue gas is usually recovered in an auxiliary waste heat boiler.

Thus, a typical primary reform installation includes a reform furnace provided with catalyst-filled reform tubes and burners, together with an external waste heat boiler through which the flue gas is passed for heat recovery via steam generation. In some cases, the waste heat boiler has been combined with the reformer furnace.

In the present invention, the waste heat boiler has been combined into the reformer furnace by means of a novel apparatus combination. The furnace unit is a substantially cylindrical vertically-extending container, suitably lined with refractory material. A coaxial central duct is vertically disposed within the container, and this duct is also suitably lined with refractory material on its external surface. Thus, an annular space is provided between the duct and the outer container, and the reform tubes are vertically suspended in this annular space. Primary burners are suitably positioned within this annular space, so as to provide external heating for the reform tubes. These burners are usually disposed at the bottom of the unit; however, burners may also be provided which extend into the annular space from the walls of the container and duct. The central duct terminates below the top of the container, so as to provide a spacing for the passage of flue gas inwards below the top of the container. Additional combustion flue gas is generated by providing a secondary burner within the duct. A chamber is provided above the container, disposed about a central opening in the top of the container through which the hot flue gas passes upwards. A steam boiler having an upper steam drum, central downcomer and annular water tubes is suspended in this chamber, and a flue gas stack extends upwards from an upper chamber outlet.

This overall arrangement results in several important operating advantages, the most important of which is that forced or induced draft is not needed for the facility, even though the steam boiler is interposed directly in the flue gas flow path. Thus, the turbine driven fans, associated ductwork and motors of the prior art are eliminated, as well as concomitant operating expenses for these units. The integrated construction of the apparatus results in a higher overall efficiency, due to elimination of downcomers and ducts. In addition, the compact arrangement of apparatus elements is less costly, since less plant area is required, as well as less foundation, since the flue gas stack is self-supporting and the waste heat boiler is integrated into the reformer. Improved process gas distribution and flow patterns are achieved, since circular headers and symmetrical piping systems are employed, as will appear infra. Since the secondary burner is disposed within the central duct, inferior fuels such as low-grade residual oils high in sulfur may be burned in this secondary burner, without danger of adverse effects on the reformer tubes. Finally, this overall arrangement is readily adaptable to diversified conditions, such as high or low operating pressures and different tube diameters. Other operating advantages and results will be described infra.

Another important reformer furnace improvement is embodied in the apparatus of the present invention, namely, a novel suspension system for supporting catalyst tubes in the furnace and maintaining these tubes under tension so as to prevent buckling or warping. In this suspension system, the lower ends of the catalyst tubes are positioned within the furnace and interconnected in a rigid manner. The tubes are arranged in rows, to form linear groups or "banks" of tubes. The upper ends of the tubes extend through the top of the furnace, and a tube mounting spring extends from the top of each tube to a rigid support bar. Thus, a support bar is disposed above each bank of tubes. One or several support bars are attached to a constant load spring, which in turn is mounted on a fixed support element. The constant-load type of spring is one which exerts a substantially constant tension regardless of load movement. One such type of spring is shown in U.S. Patent No. 2,709,057. In operation, the constant load spring provides a tension substantially equivalent to the weight of the catalyst tube bank or banks to which it is attached through the support bars and tube mounting springs. Thus, tension is constantly applied to the catalyst tubes, and under operating conditions with concomitant linear expansion of the tubes due to thermal expansion, relaxation of tube tension is effectively prevented throughout the length of the tubes. The tube mounting springs serve to accommodate for the smaller differential expansion which takes place among several individual tubes.

The spring loaded suspension aspect of the present invention provides several notable advantages. When the constant load spring provides a tension equivalent to the total weight of the catalyst-loaded tubes, the tubes are almost stress-free in operation at elevated temperatures. This is highly important, since operation at elevated pressure is thereby rendered more feasible. Since compression stress is positively prevented, under operating conditions of elevated temperature the possibiliy of tube buckling or warping is eliminated and the tubes are kept straight during heating. The prior art apparatus system, such as the lower expansion section and extremely costly external stainless steel piping assemblies external to catalyst tubes, as shown in U.S. Patent 2,660,519, have been eliminated. In addition, the tube mounting springs serve to prevent differential expansion between adjacent tubes from being transmitted into stresses, since independent differential expansion between tubes is facilitated. Finally, the spring suspension system of the present invention allows the catalyst-filled reformer tubes to be connected to a bottom manifold which is positioned by attachment to a fixed support. The stresses on an inflexible-type of lower header are thus substantially reduced, since deformation of the lower header due to thermal expansion is eliminated. Preferably, the lower header will consist of the integral lower end connection between tubes to be described infra, and provision of this integral lower end connection in combination with the upper spring suspension constitutes a preferred embodiment of the present invention.

A further novel aspect of the apparatus of the present invention concerns an integral lower end assembly which serves to connect the lower ends of a group of tubes aligned in a linear bank or row, thus forming an in situ lower manifold for gas passage in cases where the tubes are of the one-pass type with unidirectional flow of process gas. In its broadest aspect, this new apparatus configuration is formed by providing two openings in the wall of each tube, adjacent the bottom of the tube. Means to retain catalyst are provided within the tube and above the openings, and a connecting conduit is provided between each pair of adjacent tubes in the bank. Each connecting conduit extends between opposedly faced openings in adjacent tubes. A continuous gas passage is thus formed at the lower end of each bank of tubes, consisting of the lower tube ends and connecting conduits. The most effective and preferable arrangement is one in which apparatus elements are also provided at the lower end of each tube for removal of spent catalyst. These elements consist broadly of a bottom closure, a movable sleeve extending upwards within the tube from the closure to above the side openings, with a plurality of openings in the sleeve to permit gas flow, and a baffle extending inwards from the tube in the annular space between the sleeve and the tube wall, to block downwards movement of catalyst in this annular space, and concomitant plugging of the conduits. Thus, a continuous gas passage is provided whereby process gas passes through the catalyst bed, into the sleeve via openings in the sleeve above the baffle, through the sleeve, and out through lower openings in the sleeve into the header formed by lower tube ends and connecting conduits.

This apparatus arrangement provides several important advantages. Thus, the separate lower header for collection of process gas from individual tubes is eliminated. The sequential linkage of the lower ends of reformer tubes by individual connecting conduits provides automatic compensation for thermal expansion. As will appear infra, this automatic compensation is made even more effective by disposing opposite holes on a single tube end at an angle other than a straight angle, so that a zig-zag pattern of connecting conduits is produced. Another advantage of this arrangement is that a smoother flow pattern of gases from the lower tube ends is achieved, with reduced pressure drop. In addition, this tube end structure is quite simple to manufacture by casting, due to its symmetrical nature. Finally, in the preferable arrangement with internal perforated sleeve and bottom outlet, removal of catalyst is facilitated, without clogging or plugging of the header.

It is an object of the present invention to provide an improved apparatus for catalytic reforming of fluid hydrocarbons.

Another object is to provide an improved hydrocarbon reform furnace with integral waste heat boiler.

A further object is to provide an apparatus for hydrocarbon reform, in which integral recovery of waste heat is obtained without necessitating the provision of auxiliary forced-draft equipment.

An additional object is to provide a compact hydrocarbon reform furnace with improved and symmetrical process gas flow, together with integrated waste heat boiler.

Another object is to provide an improved tube support system for a hydrocarbon reform furnace.

Still a further object is to provide a tube suspension system for a hydrocarbon reform furnace which maintains the catalyst-packed reform tubes under continuous tension and prevents compression, regardless of linear thermal expansion.

Still another object is to provide an improved catalyst tube assembly, with an integral lower end header.

An object is to provide an improved lower end header for a catalyst tube assembly, together with improved means to remove catalyst from the tubes.

A further object is to provide a lower end header for a catalyst tube assembly in which the lower ends of the tubes form an integral part of the header.

Figure 2:
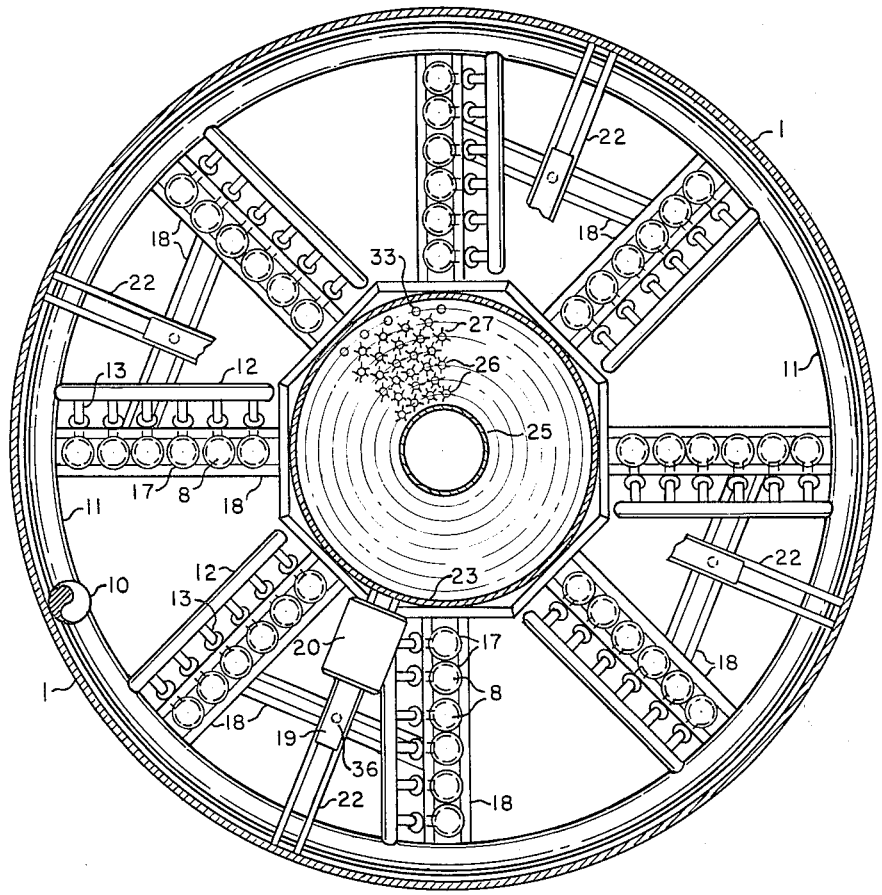
Figure 3:
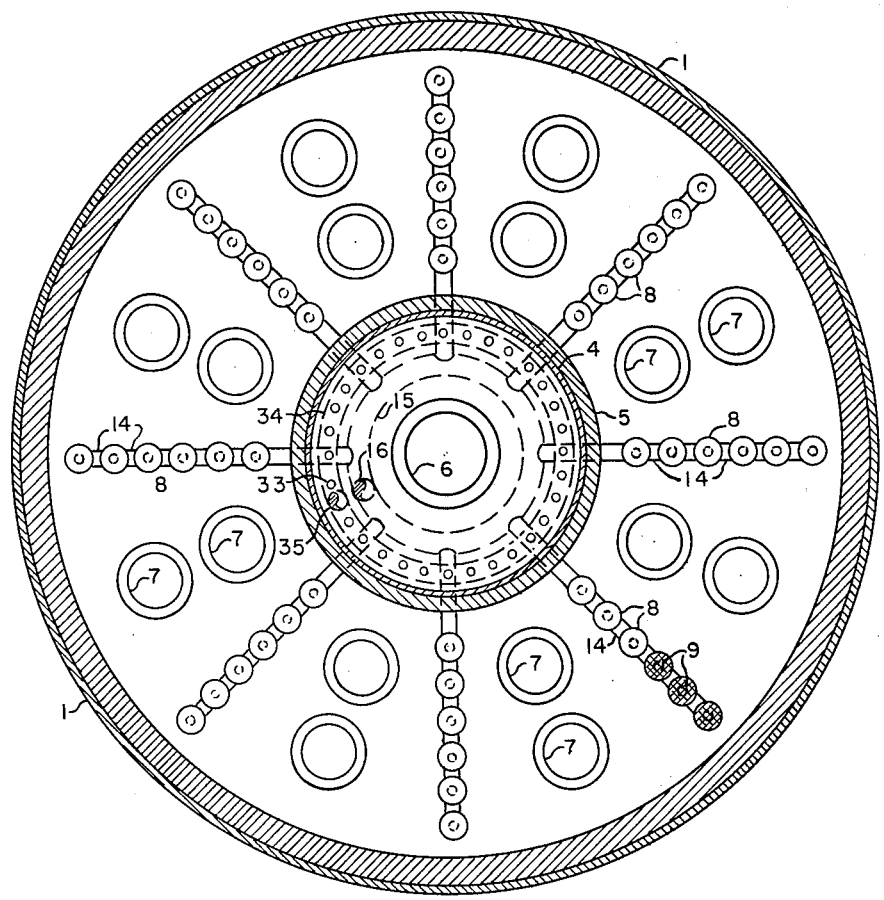
Figure 4:
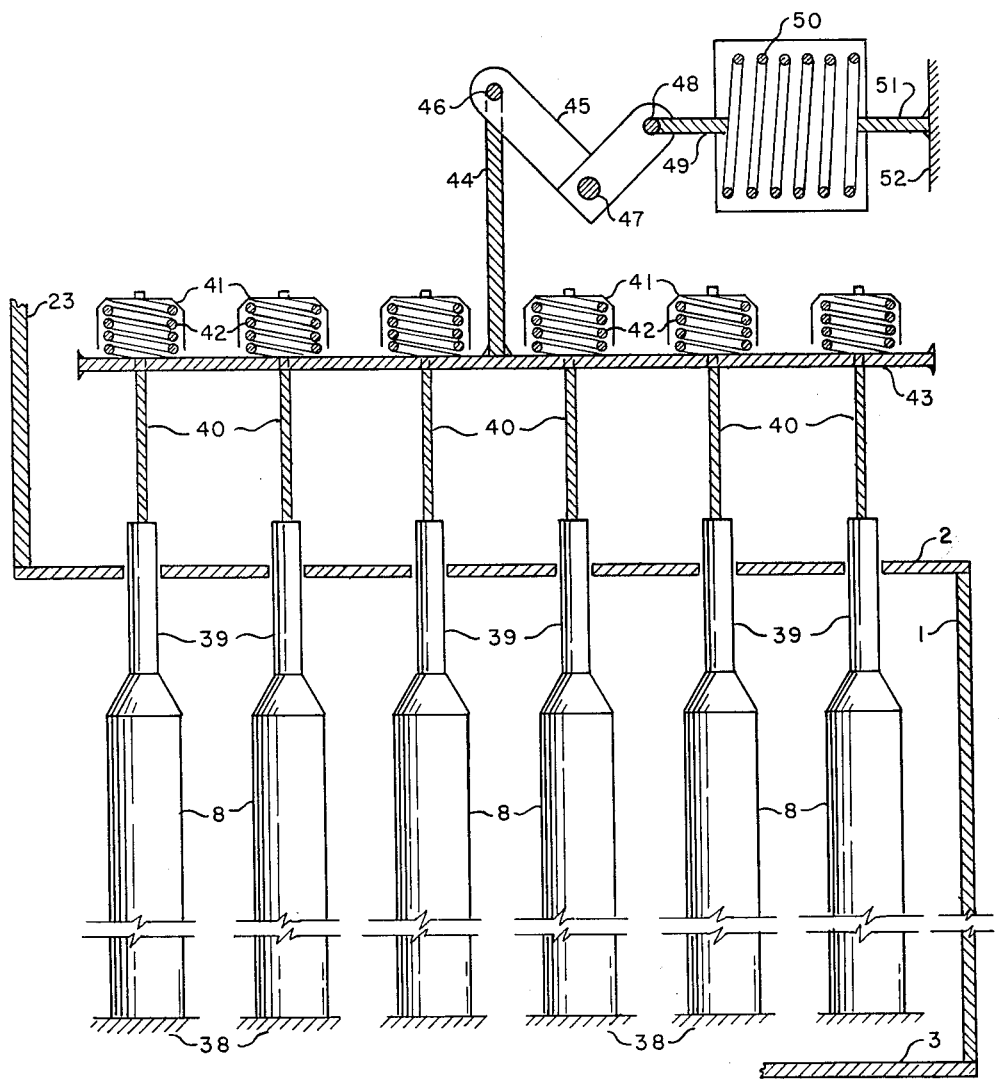
Figure 5:
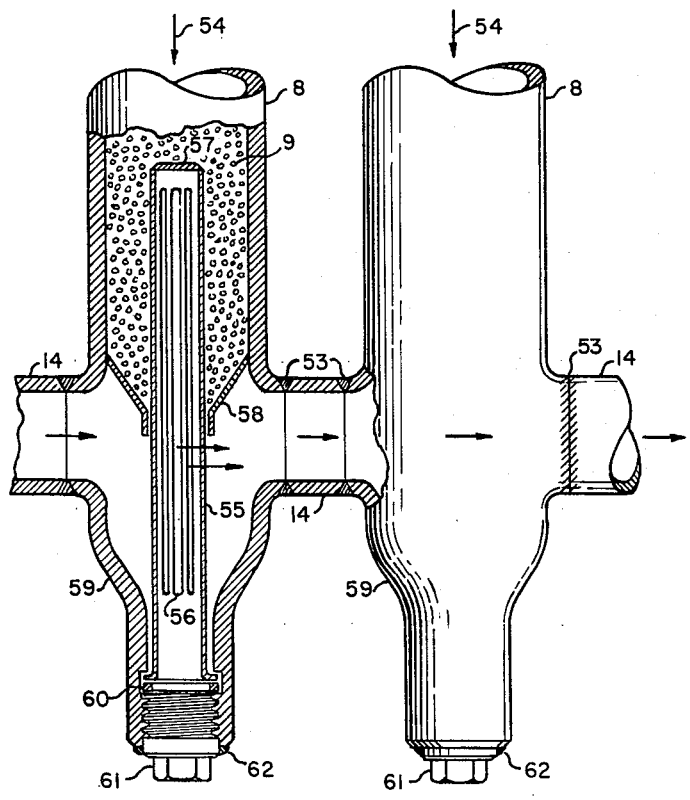

These and other objects and advantages of the present invention will become evident from the description which follows. Referring to the figures, FIGURE 1 is an overall elevation view of the reformer furnace assembly, showing a single bank of tubes, the central duct, integral waste heat boiler and auxiliary elements. FIGURE 2 is a plan view on section 2—2 of FIGURE 1, showing upper process gas conduits and the tube suspension system of the present invention. FIGURE 3 is a plan view on section 3—3 of FIGURE 1, showing the preferred layout of tube banks and burners, as well as the central duct. FIGURE 4 shows a generalized case of the tube suspension system. Finally, FIGURE 5 shows a detail elevation view of the lower tube ends assembly, with the preferred apparatus elements for bottom removal of catalyst.

Referring now to FIGURE 1, the reformer furnace is defined by container wall 1, roof 2 and floor 3. These components are generally lined with conventional refractory material such as fire brick, to maintain a thermal barrier. Container wall 1 will usually be in the form of a vertically-extending cylinder, however, as will appear infra other configurations such as a rectangular cross-section may be suitably provided in conjunction with other aspects of the present invention. A central vertical duct 4 is disposed within container 1. Duct 4 is coaxially aligned with container 1 and extends upwards from floor 3, terminating adjacent to roof 2. A spacing for flue gas passage is provided between roof 2 and the upper end of duct 4. The external surface of duct 4 is generally covered with refractory material or coating 5, and an internal secondary burner 6 is positioned within duct 4, usually at an elevation somewhat above floor 3.

The annular space within container 1 and external to duct 4 is heated by a plurality of primary burners 7, which are generally disposed in floor 3. Additional primary burners, not shown, may be positioned in wall 1, and also on the outer surface of duct 4. A plurality of reform tubes 8 filled with solid catalyst 9 are suspended or mounted within this annular space in container 1, and are externally heated by burners 7. In FIGURE 1, the tubes 8 are shown in the preferred embodiment of the present invention, namely with unidirectional gas flow to an integral lower manifold, and constant tension upper spring suspension. Thus a process gas mixture 10 consisting generally of steam and a fluid hydrocarbon such as methane is passed from an external source into the main circular feed header 11. Header 11 serves to distribute stream 10 into linear feed manifolds 12, from whence the gas mixture passes via connecting tubes 13 to tubes 8. The gas mixture now passes downwards through tubes 8, and in contact with catalyst 9 at elevated temperature the mixture is reformed to yield a product gas such as synthesis gas.

At the lower end of tubes 8, a plurality of connecting conduits 14 are provided, which extend between opposedly faced openings in the tubes. Catalyst supports, not shown, are provided within tubes 8 to retain catalyst above conduits 14. The reformed process gas mixture thus flows downwards within the tubes, and then inwards via conduits 14 and the lower ends of the several tubes 8, which in combination thus form a lower outlet header. The combined reformed gas mixture is now collected by circular outlet header 15, and passes to external utilization via 16. It will be evident that the flow of process gas may be reversed in practice, if desired, thus the input mixture of steam and fluid hydrocarbon could be passed into tubes 8 via header 15, with upwards flow of process gas in the tubes, and removal of the product synthesis gas via manifold 12 and header 10.

Referring now to the right side of FIGURE 1, the preferred apparatus combination for suspension of tubes 8 in tension under all conditions of displacement due to thermal expansion is shown. It will be understood that this preferred suspension system is applicable principally where the lower ends of the tubes 8 are substantially permanently mounted in or supported by the floor 3, whereby the lower ends of the tubes are restrained against vertical movement or displacement. A similar consideration applies when the lower tube ends are attached by conduits 14 as described supra, so that vertical motion is substantially restrained. In all such cases, when the tubes are heated vertical elongation must take place, and consequently it was possible in the prior art for compressive stress to be generated in the tube walls, with concomitant buckling or warping. In the present invention, the upper ends of the tubes 8 are attached to tube mounting springs 17, which in turn extend to linear support bar 18. Bar 18 is attached to and suspended from a lever system 19 by rigid connector 36. Levers 19 pivot about lever point 37. Lever 19 is connected in turn to the main constant load spring 20. The entire spring assembly is supported by supports 21 which extend to fixed support element 22 which is shown as a beam of the container frame structure. The operation of the constant load spring support system will be discussed in detail infra.

In the overall operation of the reformer furnace, a fuel stream consisting usually of a fluid hydrocarbon is passed into burners 7, together with an annular stream of combustion air. The exothermic reaction which takes place serves to generate and maintain the requisite temperature level in furnace 1 for adequate heating of tubes 8. The resultant hot flue gas rises in the annular space between duct 4 and wall 1, passes inwards above the upper end of duct 4, and then combines with the hot flue gas generated by secondary burner 6. It should be noted that burner 6 may be fired with an entirely different type of fuel from that employed in primary burners 7. Thus for example, lower grade fuels such as high-sulfur residual oil could be employed in burner 6, whereas such fuels could not be used in burners 7 due to the danger that such fuels and their combustion products could corrode or otherwise adversely affect reformer tubes 8.

The rising streams of flue gas from burners 6 and 7 combine at the top of container 1 in the section above duct 4, and flow upwards into chamber 23. A waste heat boiler unit is suspended in chamber 23, and serves to recover heat from the flue gas stream. The boiler unit is a special type, provided with an upper steam drum 24 from which a central water downcomer 25 extends downwards through chamber 23. Water tubes 26 extend between the steam drum 24 and the lower end of downcomer 25. Tubes 26 are preferably provided with fin tube sections 27 for better heat transfer from the rising flue gas into the water. The bottom of downcomer 25 will usually be provided with a refractory baffle 28, to prevent adverse thermal and circulatory effects due to direct heating of the downcomer. Boiler feed water is passed into steam drum 24 via 29, and product steam is withdrawn via 30. Line 66 is installed in the waste heat boiler for blow-down and drainage. The rising flue gas passes upwards from chamber 23 into discharge stack 31 provided with damper 32, and thereafter passes to atmospheric discharge. It will be noted that the entire combination of annular furnace, central duct with secondary burner, and upper heat recovery chamber, achieves the circulation of flue gas and heat recovery without necessitating provision of a forced draft unit. Thus the conventional forced draft fans or combustion air blowers are eliminated, and natural draft alone serves to achieve the circulation of flue gas through the apparatus. As discussed in detail supra, this is highly advantageous since substantial capital and operating economies are achieved.

In a preferred embodiment of the present invention, auxiliary water tubes 33 are extended downwards from steam drum 24 to auxiliary feed water manifold 34, which is supplied with feed water via 35. Water tubes 33 thus serve to insulate the inner wall of duct 4 from the direct effect of the flame from burner 6, while also providing further heat exchange surface for steam generation. This tube 33 and header 34 may be part of a boiler circulation system.

Referring now to FIGURE 2, a plan view of the upper section of the apparatus above roof 2 is presented, showing the preferred overall layout of the spring suspension and tube banks. Thus, the reformer tubes 8 are shown in linear banks, extending radially from the central axis of the unit. The individual tube mounting springs 17 extend from tubes 8 to support bar 18, which in turn is rigidly attached to connector 36. In this case, a single connector 36 extends to two bars 18. It will be appreciated that in some instances a connector such as 36 could extend to only one bar, or to 3 or more bars. Connector 36 is attached to lever 19 which is supported by constant load spring 20. Spring 20 is rigidly supported by overhead beam 22.

The feed distribution of process gas is also shown in FIGURE 2. Thus, the mixed steam-fluid hydrocarbon feed stream is passed into main feed duct 11, and is distributed into linear manifolds 12, from whence the feed gas passes via connectors 13 into tubes 8. Finally, FIGURE 2 shows in cross-section the upper chamber 23, with outer water tubes 33, inner water tubes 26 and fins 27, downcomer 25 of the waste heat boiler facility.

FIGURE 3 is a plan view on section 3—3 of FIGURE 1, and shows the preferred layout of tubes 8 disposed in banks extending radially from the central axis of container 1, with primary burners 7 aligned between banks of tubes 8. In addition, FIGURE 3 shows auxiliary water tubes 33 extending adjacent to duct 4, and serving to protect duct 4 from thermal effects due to secondary burner 6. The external refractory lining 5 provided on the outside of duct 4 is also shown.

FIGURE 4 provides a detailed exposition of the tube suspension system of the present invention. Tubes 8 are shown with rigid lower mounting or supports 38. In some cases the function of rigid mountings 38 could be carried out by a substantially rigid lower gas manifold or header, such as the arrangement described supra. In all such cases, the lower ends of tubes 8 are restrained so that downward vertical motion is prevented. Thus, linear expansion of the tubes 8 due to thermal expansion must be accommodated at the upper ends of the tubes, since otherwise the tubes would warp or buckle in operation due to thermal expansion. As shown on FIGURE 4, the tubes 8 are provided with upper sections 39 of narrower diameter. Sections 39 are a preferable feature of the present invention, and result in considerable savings in material costs. Thus, when the tube 8 is heated and expands upwards, section 39 moves upwards and through the openings in furnace roof 2. Section 39 will be free of catalyst since in normal operation this section will be displaced above roof 2 and thus will not be subject to reforming temperature. Thus it is possible to make section 39 of considerably small diameter with concomitant material savings. In addition, since section 39 is of smaller diameter, better sealing is obtained against flue gas flow through the openings in roof 2. The excess catalyst contained in 39 is used as make-up for catalyst shrinkage in tube 8, thus maintaining required catalyst level continuously in the part of tube exposed to heat.

The upper end of section 39 is attached to tube support rod 40, which extends to retention cap 41. In this embodiment of the present invention, the tubes 8 are directly supported and maintained under tension by springs 42, which are under compression. Thus, it will be evident that tube mounting springs 42 of FIGURE 4 correspond functionally to springs 17 of FIGURE 1, even though opposite spring actions are involved. Springs 42 extend between caps 41 and linear support bar 43, which corresponds to bar 18 of FIGURE 1. Bar 43 is attached by connector 44 to pivot plate 45 at bearing point 46. Plate 45 moves freely about main pivot point 47, and the downwards force exerted by connector 44 is counterbalanced by a force exerted on bearing point 48 by connector 49, which is attached to the main load spring 50. In turn, spring 50 is permanently attached by connector 51 to a rigid support 52, which may be a beam forming part of the furnace structural support.

The assemblage of pivot plate 45, connector 49 and spring 50 forms a structural grouping known as a "constant load spring," which may be defined as a spring-actuated counterbalance which produces a constant supporting effect on a load which travels in any linear direction, such as in a vertical direction. The geometry of the system is such that the turning moment of the force exerted by the load attached to connector 44 about pivot point 47 is always equally opposed by the turning moment of the force exerted by spring 50. Thus, regardless of displacement or motion of plate 45 about pivot 47, a substantially constant tension will be exerted on connector 44. In operation, differential expansion between tubes 8 is accommodated by springs 42, while the overall support and tension in the system is exerted by the spring 50, through the constant load assemblage.

This apparatus arrangement represents a substantial improvement over prior art practice. In prior systems, individual springs served to provide the entire support for each tube. Under such circumstances, tube displacement due to thermal expansion resulted in a partial or complete relaxation of the spring support, with concomitant development of linear compressive forces in the tube, particularly towards the lower end. Thus warping, bending or other lateral tube deformation would tend to take place in practice at normal operating temperatures. In the present invention, the spring support system provides constant tension on the tubes, regardless of thermal expansion, because the constant load spring action is substantially constantly exerted on connector 44, regardless of vertical displacement.

One typical example of a prior art tube suspension system would consist of a structure in which elements 44–51 are omitted, and linear support bar 43 is attached to fixed support element 52. Springs 42 in this case would be under maximum compression when tubes 8 are cold, and consequently these springs would then exert maximum tension on the tubes. As the furnace is heated up to normal operating temperature, linear expansion of tubes 8 takes place, and this would result in concomitant relaxation of the compression of springs 42. Consequently, the tension on tubes 8 would be decreased, and linear compressive stresses would be formed in the tubes at their lower ends, due to the weight of the tubes plus catalyst. These compressive stresses would eventually result in the warping, bending or buckling, or other deterioration of the tubes.

FIGURE 5 is a detail drawing of a preferred apparatus arrangement of the lower tube ends, together with the preferred apparatus elements for bottom removal of catalyst. In FIGURE 5, adjacent openings in the walls of tubes 8 are connected by conduits 14, preferably by means of welded joints 53. The process gas stream 54 thus passes downwards through catalyst bed 9, and thereafter combines with other reformed process gas at the lower end of the tube, passing horizontally out of the apparatus via a continuous outlet header formed by lower tube ends and the connecting conduits 14.

A novel apparatus combination is provided inside tube 8, by means of which the catalyst bed 9 is retained above the lower gas passage while process gas is passed out of the catalyst bed. This apparatus arrangement also facilitates the periodic withdrawal of catalyst when replacement is necessary. The principal element of this combination is vertical sleeve 55, which is provided with small openings such as slits 56 for continuous gas passage from the bed 9 to the outlet header. Slits 56 are long, narrow openings which prevent catalyst from passing into sleeve 55, while allowing gas flow to take place. A cover 57 is provided at the upper end of sleeve 55, to prevent entry of catalyst into the sleeve at this point. A baffle element 58 is attached to the inside surface of tube 8, and extends inwards to terminate in close proximity to sleeve 55. Baffle 58 serves to support and maintain catalyst bed 9 above the lower tube end, and to prevent catalyst from flowing downwards into conduit 14.

In normal operation, the process gas flows downwards through catalyst bed 9, and into sleeve 55 via slits 56. The gas then leaves sleeve 55 at its lower section, passing out through slits 56 to join the main stream of reformed gas in the lower end of tube 8.

Sleeve 55 may be retained within tube 8 by any convenient means, but preferably tube 8 is provided with lower neck 59 in which sleeve 55 is mounted and retained by snap ring 60 and threaded plug 61 which is sealwelded at 62. This lower end closure is preferably the tube closure described and claimed in U.S. patent application No. 120,556, filed June 29, 1961, now U.S. Patent No. 3,127,248. Other types of closure means may be provided, such as a bolted flange.

When catalyst removal is necessary, the weldment 62 is removed, plug 61 is unscrewed, and snap ring 60 is removed. Sleeve 55 is then pulled downwards and out of tube 8. The catalyst particles 9 then flow out of tube 8, falling through neck 59 without passing into conduit 14. It will be evident that baffle 58 serves to direct the catalyst particles centrally for even flow, by virtue of its funnel-shaped configuration. Other simpler configurations may be adopted for baffle 58, such as a horizontal orifice-like shape, however, a downward slope so as to provide a funneling action for catalyst removal is preferable. In addition, baffle 58 could alternatively be attached to sleeve 55, rather than to tube 8. In this case, the lower end of tube 8 would not be provided with a tapered neck such as 59, instead a lower flanged closure would have to be extended across the entire lower end of tube 8.

Various alternatives may be adopted with respect to the tube end assembly shown in FIGURE 5. Thus, the opposite openings on each tube are shown at 180° from each other. These openings could alternatively be positioned at an obtuse angle, with adjacent tubes being rotated by 180°. The conduits 14 would thus form a zig-zag pattern. This alternative would be useful when a large number of tubes is provided in each bank, since

What I claim is:

1. Hydrocarbon reform furnace with improved catalyst tube suspension, comprising a vertically extending container, a plurality of vertically oriented catalyst-filled reform tubes disposed within said container in a plurality of linear tube banks, the upper end of each of said tubes extending through the top of said container, the lower ends of said tubes being rigidly mounted whereby substantial vertical motion to accommodate thermal tube expansion is prevented, a rigid support bar disposed above each of said banks of tubes and external to said container, a plurality of tube mounting springs, each of said mounting springs extending from said support bar to the upper end of one of said tubes, a constant load spring, said constant load spring extending from said support bar to a fixed support element external to said container, means for passing a mixture of steam and fluid hydrocarbon through said tubes whereby said mixture is catalytically reformed to synthesis gas, and heating means disposed within said container to externally heat said tubes.

2. Apparatus of claim 1, in which said fixed support element comprises a structural member attached to said container.

3. Apparatus of claim 1, in which said container is cylindrical, and each of said tube banks is radially oriented with respect to the central vertical axis of said container.

4. Apparatus of claim 3, in which said constant load spring extends from a plurality of support bars to said fixed support element.

5. Apparatus of claim 1, in which the lower ends of the tubes in each of said linear banks of tubes extend to a rigidly mounted duct element for gas passage, whereby a uni-directional flow of process gas takes place through said tubes from one end to the other.

6. Apparatus of claim 5, in which said rigidly mounted duct element is formed by providing two opposed horizontal openings in the wall of each of said tubes, said openings being spaced immediately above the lower ends of said tubes, together with support means within said tubes and above said openings to prevent catalyst from passing downwards into said openings, and a plurality of connecting conduits, each of said conduits extending between opposedly faced openings in adjacent tubes, together with process gas passage means extending from an opening in the end tube of said tube bank.

7. Furnace for catalytic steam reforming of fluid hydrocarbons which comprises a vertically extending cylindrical container, a coaxial central duct within said container, said duct extending upwards from the base of said container and terminating near the top of said container, a plurality of vertically oriented catalyst-filled reform tubes disposed in linear banks within said container, said tube banks extending radially in the annular space external to said duct, the upper end of each of said tubes extending through the top of said container, a rigid support bar disposed above each of said banks of tubes and external to said container, a plurality of tube mounting springs, each of said mounting springs extending from said support bar to the upper end of one of said tubes, a constant load spring, said constant load spring extending from said support bar to a fixed support element external to said container, each of said tubes being provided with two lower horizontal openings, said openings being spaced immediately above the lower ends of said tubes and on opposite sides of each tube, support means within each of said tubes and above said openings to prevent catalyst from passing downwards into said openings, a plurality of connecting conduits, each of said conduits extending between opposedly faced openings in adjacent tubes, means to pass a mixture of steam and fluid hydrocarbon through said tubes whereby said mixture is catalytically reformed to synthesis gas, primary burner means for heating said tubes at the base of said container and external to said duct, a secondary burner within said duct, a central flue gas chamber, said chamber extending upwards from an outlet in the top of said container, a steam boiler unit vertically positioned in said chamber, said steam boiler unit comprising an upper steam drum, a central downcomer, a plurality of annular water tubes extending downwards from said steam drum to the lower end of said downcomer, means for passing boiler feed water to said steam drum, means to remove generated steam from said steam drum, and a natural draft flue gas stack extending upwards from said chamber.

8. Furnace for catalytic steam reforming of fluid hydrocarbons which comprises a vertically extending cylindrical container, a coaxial central duct within said container, said duct extending upwards from the base of said container and terminating near the top of said container, a plurality of vertically oriented catalyst-filled reform tubes disposed in linear banks within said container, said tube banks extending radially in the annular space external to said duct, the upper end of each of said tubes extending through the top of said container, a rigid support bar disposed above each of said banks of tubes and external to said container, a plurality of tube mounting springs, each of said mounting springs extending from said support bar to the upper end of one of said tubes, a constant load spring, said constant load spring extending from said support bar to a fixed support element external to said container, each of said tubes being provided with two lower horizontal openings, said openings being spaced immediately above the lower ends of said tubes and on opposite sides of each tube, support means within each of said tubes and above said openings to prevent catalyst from passing downwards into said openings, a plurality of connecting conduits, each of said conduits extending between opposedly faced openings in adjacent tubes, means to pass a mixture of steam and fluid hydrocarbon through said tubes whereby said mixture is catalytically reformed to synthesis gas, primary burner means for heating said tubes at the base of said container and external to said duct, a secondary burner within said duct, a central flue gas chamber, said chamber extending upwards from an outlet in the top of said container, a steam boiler unit vertically positioned in said chamber, said steam boiler unit comprising an upper steam drum, a central downcomer, a plurality of annular water tubes extending downwards from said steam drum to the lower end of said downcomer, means for passing boiler feed water to said steam drum, means to remove generated steam from said steam drum, a plurality of peripheral water tubes for said steam boiler, said peripheral water tubes extending downwards from said steam drum into said duct and juxtaposed adjacent the inner perimeter of said duct, said peripheral water tubes terminating at an auxiliary feed water manifold within said duct and below said secondary burner, means to pass boiler feed water to said auxiliary feed water manifold, and a natural draft flue gas stack extending upwards from said chamber.

9. Furnace for catalytic steam reforming of fluid hydrocarbons which comprises a vertically extending cylindrical container, a coaxial central duct within said container, said duct extending upwards from the base of said container and terminating near the top of said container, a plurality of vertically oriented catalyst-filled reform tubes disposed in linear banks within said container, said tube banks extending radially in the annular space external to said duct, the upper end of each of said tubes extending through the top of said container, a rigid support bar disposed above each of said banks of tubes and external to said container, a plurality of tube mounting springs, each of said mounting springs extending from said support bar to the upper end of one of said tubes, a constant load spring, said constant load spring extending from said support bar to a fixed support element external to said container, each of said tubes being provided with two lower horizontal openings, said openings being spaced immediately above the lower ends of said tubes and on opposite sides of each tube, means at the bottom of each tube for catalyst retention and controlled removal comprising a bottom tube closure, a gas transfer sleeve extending upwards within said tube from said closure, said sleeve being provided with a plurality of side openings for gas passage and an upper closure whereby entry of catalyst into said sleeve is prevented, an annular baffle external to said sleeve within said tube and above said tube openings, said baffle being attached to said tube and terminating adjacent to said sleeve, whereby passage of catalyst downwards into said openings is prevented, a plurality of connecting conduits, each of said conduits extending between opposedly faced openings in adjacent tubes, means to pass a mixture of steam and fluid hydrocarbon through said tubes whereby said mixture is catalytically reformed to synthesis gas, primary burner means for heating said tubes at the base of said container and external to said duct, a secondary burner within said duct, a central flue gas chamber, said chamber extending upwards from an outlet in the top of said container, a steam boiler unit vertically positioned in said chamber, said steam boiler unit comprising an upper steam drum, a central downcomer, a plurality of annular water tubes extending downwards from said steam drum to the lower end of said downcomer, means for passing boiler feed water to said steam drum, means to remove generated steam from said steam drum, and a natural draft flue gas stack extending upwards from said chamber.

10. Apparatus of claim 9, in which said bottom tube closure is a threaded plug having a straight form machine thread, whereby said thread is substantially free of shear stress, said plug being back welded to said tube.

11. Apparatus of claim 10, in which said annular baffle is funnel-shaped and coaxial with said tube.

12. Furnace for catalytic steam reforming of fluid hydrocarbons which comprises a vertically extending container, a central duct within said container, said duct extending upwards from the base of said container and terminating near the top of said container, a plurality of vertically oriented catalyst-filled reform tubes disposed in linear banks within said container and external to said duct, the upper end of each of said tubes extending through the top of said container, a rigid support bar disposed above each of said banks of tubes and external to said container, a plurality of tube mounting springs, each of said mounting springs extending from said support bar to the upper end of one of said tubes, a constant load spring, said constant load spring extending from said support bar to a fixed support element external to said container, means to pass a mixture of steam and fluid hydrocarbon through said tubes whereby said mixture is catalytically reformed to synthesis gas, primary burner means for heating said tubes at the base of said container and external to said duct, a secondary burner within said duct, a central flue gas chamber, said chamber extending upwards from an outlet in the top of said container, a steam boiler unit positioned in said chamber, means for passing boiler feed water to said steam boiler, means to remove generated steam from said steam boiler, and a natural draft flue gas stack extending upwards from said chamber.

13. Furnace for catalytic steam reforming of fluid hydrocarbons which comprises a vertically extending container, a central duct within said container, said duct extending upwards from the base of said container and terminating near the top of said container, a plurality of vertically oriented catalyst-filled reform tubes disposed in linear banks within said container and external to said duct, the upper end of each of said tubes extending through the top of said container, a rigid support bar disposed above each of said banks of tubes and external to said container, a plurality of tube mounting springs, each of said mounting springs extending from said support bar to the upper end of one of said tubes, a constant load spring, said constant load spring extending from said support bar to a fixed support element external to said container, means to pass a mixture of steam and fluid hydrocarbon through said tubes whereby said mixture is catalytically reformed to synthesis gas, primary burner means for heating said tubes at the base of said container and external to said duct, a secondary burner within said duct, a central flue gas chamber, said chamber extending upwards from an outlet in the top of said container, a steam boiler unit vertically positioned in said chamber, said steam boiler unit comprising an upper steam drum, a central downcomer, a plurality of annular water tubes extending downwards from said steam drum to the lower end of said downcomer, means for passing boiler feed water to said steam drum, and means to remove generated steam from said steam drum, and a natural draft flue gas stack extending upwards from said chamber.

14. Apparatus of claim 13, in which said annular water tubes are provided with external fins, whereby improved heat transfer is attained.

15. Apparatus of claim 13, in which said fixed support element external to said container comprises a structural member attached to said container.

References Cited by the Examiner
UNITED STATES PATENTS

| | | | |
|---|---|---|---|
| 1,246,164 | 11/17 | Ruegger | 220—46 |
| 2,253,510 | 8/41 | Dunham | 23—288.92 |
| 2,260,153 | 10/41 | Nofsinger | 23—288 |
| 2,346,348 | 4/44 | Barnes | 122—356 |
| 2,601,001 | 6/52 | Patterson | 48—196 |
| 2,660,519 | 11/53 | McCarthy | 23—288.92 |
| 2,677,601 | 5/54 | Ruth | 23—284 |
| 2,709,057 | 5/55 | Gould | 248—54 |
| 2,946,547 | 7/60 | Grabe | 248—54 |
| 2,985,516 | 5/61 | Traue et al. | 23—288.3 |
| 3,062,197 | 11/62 | Fleischer | 122—510 |

MORRIS O. WOLK, *Primary Examiner.*

GEORGE D. MITCHELL, *Examiner.*